United States Patent
Siulinski et al.

(10) Patent No.: US 8,825,930 B2
(45) Date of Patent: Sep. 2, 2014

(54) UNIVERSAL SERIAL BUS (USB) TO DIGITAL VIDEO

(71) Applicants: James A. Siulinski, Westbrook, ME (US); Steven M. Waldstein, Scarborough, ME (US)

(72) Inventors: James A. Siulinski, Westbrook, ME (US); Steven M. Waldstein, Scarborough, ME (US)

(73) Assignee: Patriot Funding, LLC, Great Falls, VA (US)

( * ) Notice: Subject to any disclaimer, the term of this patent is extended or adjusted under 35 U.S.C. 154(b) by 0 days.

(21) Appl. No.: 13/680,916

(22) Filed: Nov. 19, 2012

(65) Prior Publication Data

US 2013/0086297 A1 Apr. 4, 2013

Related U.S. Application Data

(63) Continuation of application No. 12/815,563, filed on Jun. 15, 2010, now Pat. No. 8,316,164.

(60) Provisional application No. 61/187,156, filed on Jun. 15, 2009.

(51) Int. Cl.
*G06F 13/12* (2006.01)
*H04N 7/18* (2006.01)
*H04N 7/173* (2011.01)
*G06F 13/40* (2006.01)
*H04L 12/28* (2006.01)

(52) U.S. Cl.
CPC ........ *G06F 13/4009* (2013.01); *H04L 12/2803* (2013.01)
USPC ................................ 710/71; 725/74; 725/105

(58) Field of Classification Search
None
See application file for complete search history.

(56) References Cited

U.S. PATENT DOCUMENTS

| | | | |
|---|---|---|---|
| 8,255,576 B2 | 8/2012 | Siulinski et al. | |
| 8,316,164 B2 | 11/2012 | Siulinski et al. | |
| 2009/0248924 A1 | 10/2009 | Melin | |
| 2009/0268824 A1* | 10/2009 | Fukuda | 375/244 |
| 2010/0027728 A1* | 2/2010 | Sugita et al. | 375/354 |
| 2010/0091180 A1 | 4/2010 | Liu et al. | |
| 2010/0104029 A1* | 4/2010 | Lee et al. | 375/257 |
| 2010/0318697 A1 | 12/2010 | Siulinski et al. | |
| 2010/0318704 A1 | 12/2010 | Siulinski et al. | |

FOREIGN PATENT DOCUMENTS

| | | | |
|---|---|---|---|
| JP | 2010287240 A | 12/2010 | |
| JP | 2010288283 A | 12/2010 | |
| KR | 20100134527 A | 12/2010 | |
| KR | 20100134528 A | 12/2010 | |

OTHER PUBLICATIONS

"[Feature] USB 3.0, HDMI to Clash in Mobile Space (2)", [Online]. Retrieved from the Internet: <URL: http://techon.nikkeibp.co.jp/article/HONSHI/20090330/167975/>, (Apr. 2009), 3 pgs.

(Continued)

*Primary Examiner* — Alan Chen
(74) *Attorney, Agent, or Firm* — Schwegan, Lundberg & Woessner, P.A.

(57) ABSTRACT

This document discusses, among other things, a system and method for serializing a video signal and providing non-packet-based serialized video information to a physical Universal Serial Bus (USB) interface and, in certain examples, receiving the non-packet-based serialized video information from the physical USB interface, deserializing the received non-packet-based serialized video information, and providing a high definition output signal to a video port (e.g., an HD video port, such as HDMI, DisplayPort, etc.) using the deserialized video information.

20 Claims, 2 Drawing Sheets

(56) References Cited

OTHER PUBLICATIONS

"U.S. Appl. No. 12/815,552, Non Final Office Action mailed Sep. 26, 2011", 9 pgs.

"U.S. Appl. No. 12/815,552, Notice of Allowance mailed Apr. 27, 2012", 5 pgs.

"U.S. Appl. No. 12/815,552, Response filed Feb. 27, 2012 to Non Final Office Action mailed Sep. 26, 2011", 11 pgs.

"U.S. Appl. No. 12/815,563 , Response filed Feb. 13, 2012 to Non Final Office Action mailed Sep. 12, 2011", 9 pgs.

"U.S. Appl. No. 12/815,563, Final Office Action mailed Apr. 12, 2012", 5 pgs.

"U.S. Appl. No. 12/815,563, Non Final Office Action mailed Sep. 12, 2011", 8 pgs.

"U.S. Appl. No. 12/815,563, Notice of Allowance mailed Jul. 19, 2012", 5 pgs.

"U.S. Appl. No. 12/815,563, Response filed Jul. 12, 2012 to Final Office Action mailed Apr. 12, 2012", 8 pgs.

"DisplayPort, From Wikipedia, the free encyclopedia", [Online]. Retrieved from the Internet: <URL: http://en.wikipedia.org/wiki/DisplayPort, 13 pgs.

Heck, Howard, "Physical Layer (PHY) Specification", SuperSpeed USB Developers Conference, San Jose, California, (Nov. 17-18, 2008), 22 pgs.

\* cited by examiner

UNIVERSAL SERIAL BUS (USB) TO DIGITAL VIDEO

CROSS-REFERENCE TO RELATED APPLICATIONS

This application is a continuation of and claims the benefit of priority under 35 U.S.C. §120 of U.S. patent application Ser. No. 12/815,563, filed on Jun. 15, 2010, which claims the benefit under 35 U.S.C. §119(e) of U.S. Provisional Application No. 61/187,156, filed on Jun. 15, 2009, the benefit of priority of each of which is claimed hereby, and each of which are incorporated by reference herein in its entirety.

BACKGROUND

Universal Serial Bus (USB) is a serial bus communication standard designed to provide a standard communication port between computer hardware and a host computer. Many computer devices or peripherals (e.g., mice, keyboards, scanners, digital cameras, printers, media players, external hard drives, etc.) can be coupled to a host computer using USB.

Released in 1996, USB 1.0 had data transfer capabilities of 12 Mbits/s. In 2000, USB 2.0 was released, having data transfer capabilities of 480 Mbits/s. In 2008, USB 3.0 was released, now with data transfer capabilities of 5 Gbits/s. As the data transfer capabilities for the USB connector have increased, the potential applications of the connector have grown.

OVERVIEW

This document discusses, among other things, a system and method for serializing a video signal and providing non-packet-based serialized video information to a physical Universal Serial Bus (USB) interface and, in certain examples, receiving the non-packet-based serialized video information from the physical USB interface, deserializing the received non-packet-based serialized video information, and providing a high definition output signal to a video port (e.g., an HD video port, such as HDMI, DisplayPort, etc.) using the deserialized video information.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventor has recognized, among other things, that digital video (in certain examples high definition digital video) or other digital information can be transferred from a device containing a USB port to a remote device. In certain examples, the remote device can include a display, such as a high definition digital video display having a digital interface (e.g., a High-Definition Multimedia Interface (HDMI), a DisplayPort, a Digital Visual Interface (DVI), etc.), an electronic device including a display, a physical USB interface, such as a USB cable, or one or more other devices remote from the device containing the USB port. It is understood that the USB port can be compatible with any version of the Universal Serial Bus standard including, but not limited to, USB 1.0, USB 1.1, USB 2.0, USB 3.0 and combinations thereof. USB 3.0 may be referred to as SuperSpeed USB.

Further, the present inventor has recognized, among other things, that the USB interface can be re-used, or used for more than one function on the device, such as by using a switch. In certain examples, re-using the USB interface, or using the interface for more than one function on the device can reduce the size or the cost of the device, can reduce electrostatic discharge (ESD) concerns, or can inhibit one or more other factors involved with adding I/O interfaces to a device.

In an example, the transfer of video or other digital data need not be USB compliant. In certain examples, instead of using a packet-based USB protocol, the digital data can be transferred using the USB transmission data pairs with a serialization/deserialization scheme (e.g., different than a typical USB communication). In an example, a USB controller associated with the USB port can be disconnected from the physical layer, and one or more other controllers can be used to transfer the digital video on the USB port, without using the USB controller, or without using the packet-based USB protocol. In certain examples, disconnecting the USB controller can be less complex, and therefore, a more attractive approach to transfer the video or other digital data.

Accordingly, digital video can be transferred from a portable device to an existing digital video port (e.g., HDMI, DisplayPort, etc.) of an external display using a USB connector on the portable device, utilizing the USB data transmission rates to transfer high definition video, as well as utilizing the small size of the USB connector, and the low power needs of the USB interface.

Figure 1:
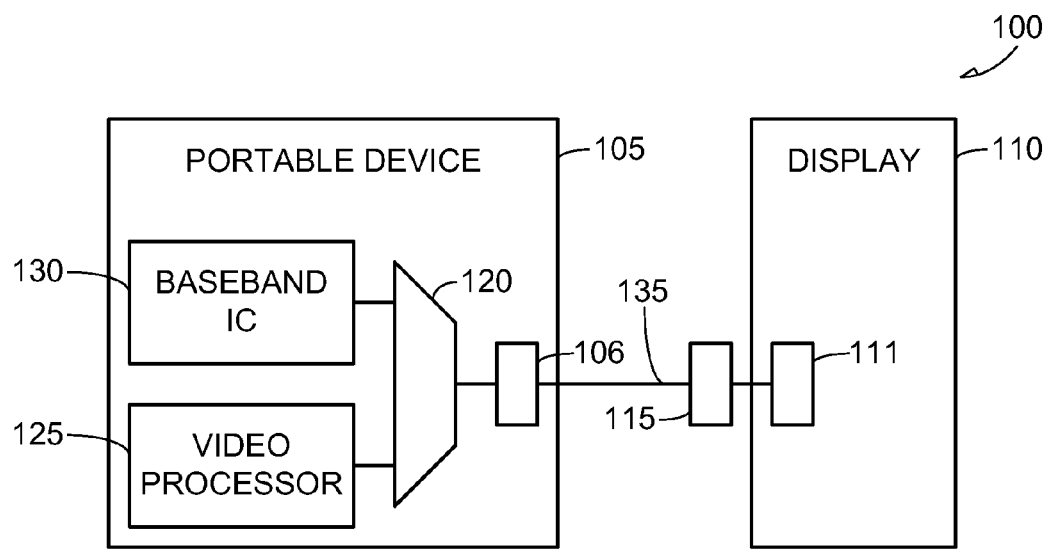
FIG. 1 illustrates generally an example of a system including a portable device having a USB 3.0 port coupled to a digital video port of a display.

FIG. 1 illustrates generally an example of a system 100 including a portable device 105 having a USB 3.0 port (or connector) 106 coupled to a digital video port (or connector) 111 of a display 110.

In certain examples, the portable device 105 can include a mobile phone, a media player, a camera, a camcorder, a computer, or one or more other devices (e.g., non-portable devices) having the USB 3.0 port 106. In an example, the portable device 105 can include a video processor 125, a baseband integrated circuit (IC) 130, and a USB switch 120 coupled to the USB 3.0 port 106. In other examples, the baseband IC 130 can be replaced by one or more other USB or other controllers (e.g., a media processor, etc.) configured to provide information to be transferred using the USB 3.0 port 106 of the portable device 105.

In certain examples, the USB switch 120 can be configured to switch between multiple USB components in the portable device 105, such as the baseband IC 130, the video processor 125, or one or more other USB component. In an example, the video processor 125 can be configured to produce a video output to be shown on a display of the portable device 105. In many examples, the display on the portable device 105 is small. Accordingly, a user can desire to display the video output on a different (e.g., larger) video display.

In an example, the display 110 can include a television display (e.g., a high definition television display), a computer monitor, or one or more other displays including a digital interface. In certain examples, the digital video port 111 can include an HDMI port, a DisplayPort, a DVI port, or one or more other digital interfaces.

Many existing displays include a high definition digital interface, such as HDMI or DisplayPort. In an example, the portable device 105 can be configured to use the existing high definition digital interface (e.g., the digital video port 111), along with the USB 3.0 port 106, to transfer high definition video (e.g., 1080p, etc.) from the portable device 105 to the display 110. In an example, information from the video processor 125 of the portable device 105 can be serialized and transferred utilizing the data transmission capabilities of the USB 3.0 port 106 to an external display, such as the display 110.

In the example of FIG. 1, the USB 3.0 port 106 of the portable device 105 is coupled to the digital video port 111 of the display 110 using a USB 3.0 cable 135 and a digital video deserializer 115. In certain examples, the USB 3.0 cable 135 can include the digital video deserializer 115, or the digital video deserializer 115 can be a separate additional component configured to receive a standard USB 3.0 connector, and couple to the digital video port 111.

Figure 2:
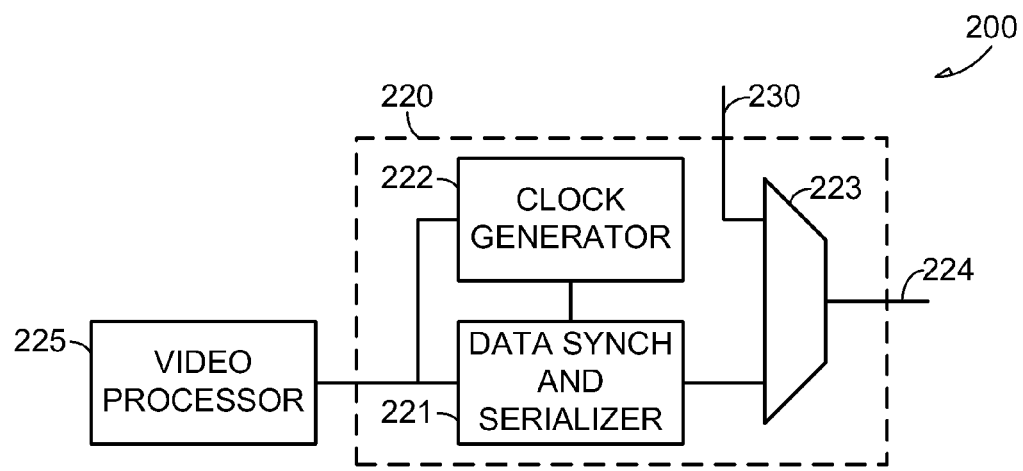
FIG. 2 illustrates generally an example of a system including a USB switch and video serializer.

FIG. 2 illustrates generally an example of a system 200 including a USB switch and video serializer 220, including a data synch and serializer 221, a clock generator 222, and a USB switch 223. In an example, the USB switch and video serializer 220 can be configured to receive information from a video processor 225 at the clock generator 222 and at the data synch and serializer 221. In an example, the data synch and serializer 221 can be configured to receive the information from the video processor 225 and create a data stream configured to be transmitted through a USB 3.0 port and cable to a deserializer coupled to a digital video port (e.g., HDMI, DisplayPort, etc.).

In an example, the data stream from the data synch and serializer 221 can be received by the USB switch 223. In certain examples, the USB switch 223 can be configured to receive information from one or more other sources (e.g., using input 230), such as a baseband IC, another video processor, or one or more other I/O interfaces for a portable device, and can be configured to switch between the multiple sources to create a single output 224, utilizing a single USB 3.0 port for more than one I/O interface.

In other examples, a single USB 3.0 port can be designated on the portable device 105 to transfer video data to a digital video port of a display (e.g., using the data synch and serializer 221, a USB 3.0 cable, and a subsequent deserializer).

In an example, some or all of the functionality of the data synch and serializer 221 or the clock generator 222 can be included in the video processor 225.

Figure 3:
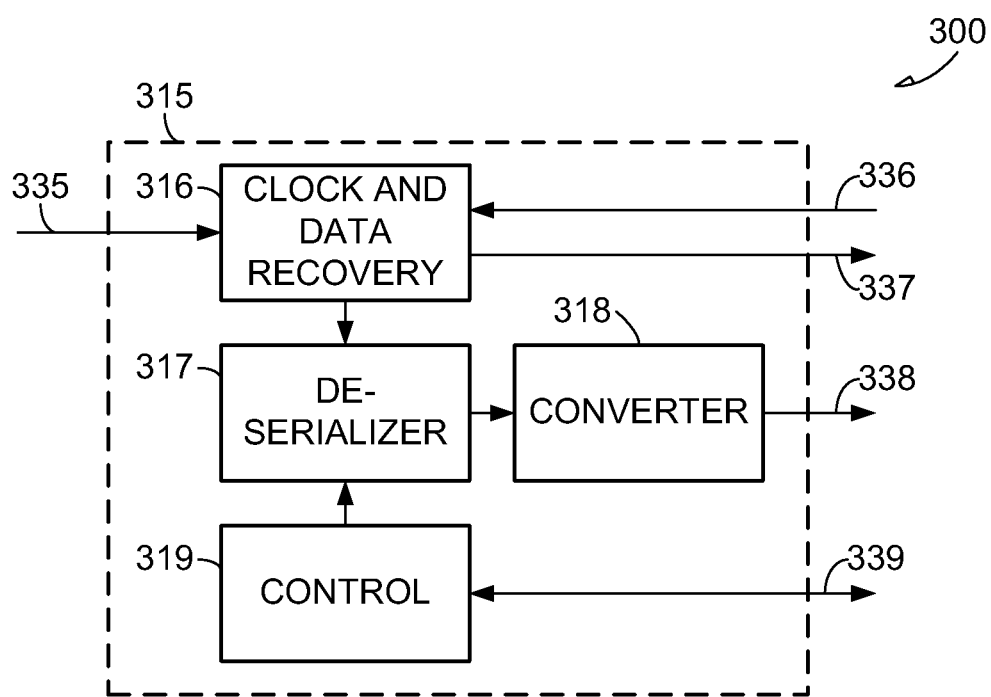
FIG. 3 illustrates generally an example of a system including a deserializer.

FIG. 3 illustrates generally an example of a system 300 including a deserializer 315 configured to receive an input 335 (e.g., from a USB 3.0 cable) and create an output 338 configured to be received from a digital video port (e.g., HDMI, DisplayPort, etc.). In certain examples, the output 338 can include HDMI data, configured to be received using a standard HDMI port of a high definition television or other display, or the output 338 can include DisplayPort data, configured to be received using a standard DisplayPort of a computer monitor or other display.

In an example, the deserializer 315 can include a clock and data recovery module 316 configured to receive information from the input 335. Further, the clock and data recovery module 316 can be configured to receive power (e.g., from the digital video port, from an external AC adapter, etc.), and in certain examples, to produce a clock signal using the received information. In an example, the deserializer 315 can be configured to receive power from a separate power supply, distinct from the digital video port. In certain examples, power can be received from an external AC adapter. In an example, the external AC adapter can connect in-line with either the input 335 portion or the output 338 portion of the deserializer 315, so as to not create additional external hardware (e.g., adapters, cables, etc.) for the system 300.

Further, the deserializer 315 can include a deserializer module 317 configured to receive information from the clock and data recovery module 316, and a converter 318 configured to receive information from the deserializer module 317 and produce the output 338. In some examples, deserializing and converting of a received video data stream can be performed in the same module. In certain examples, the deserializer 315 can include a control module 319 configured to send or receive control signals to or from the digital video port (e.g., to control the deserialization, to control one or more functions of a portable device coupled to the deserializer 315 using the input 335, etc.).

In certain examples, HD video can include video having a resolution greater than or equal to 720p (e.g., 1080i, 1080p, etc.). It is understood that the USB port can be compatible with any USB standard including, but not limited, USB 1.0, USB 1.1, USB 2.0, USB 3.0 and combinations thereof.

ADDITIONAL NOTES & EXAMPLES

In Example 1, a system includes a deserializer configured to receive non-packet-based serialized video information using a physical Universal Serial Bus (USB) interface, to deserialize the received non-packet-based serialized video information, and to provide a high definition output signal to a video port using the deserialized video information.

In Example 2, Example 1 optionally includes a converter configured to convert the deserialized video information to the high definition output signal.

In Example 3, the non-packet-based serialized video information of any one or more of Examples 1-2 optionally includes non-packet-based serialized high definition video information, and the deserialized video information of any one or more of Examples 1-2 optionally includes deserialized high definition video information.

In Example 4, the non-packet-based serialized high definition video information of any one or more of Examples 1-3 optionally includes at least one of a 720p, 1080i, or 1080p video stream.

In Example 5, the high definition output signal of any one or more of Examples 1-4 optionally includes a High Definition Multimedia Interface (HDMI) compatible signal, and the video port of any one or more of Examples 1-4 optionally includes an HDMI video port.

In Example 6, the high definition output signal of any one or more of Examples 1-5 optionally includes a DisplayPort compatible signal, and the video port of any one or more of Examples 1-5 optionally includes a DisplayPort video port.

In Example 7, the physical USB interface of any one or more of Examples 1-6 optionally includes a physical USB 3.0 interface.

In Example 8, any one or more of Examples 1-7 optionally includes the physical USB interface and the video port.

In Example 9, any one or more of Examples 1-8 optionally includes an integrated circuit, the integrated circuit including the deserializer.

In Example 10, the video port of any one or more of Examples 1-9 is optionally configured to provide power to the deserializer.

In Example 11, the deserializer of any one or more of Examples 1-10 is optionally configured to receive power from the physical USB interface.

In Example 12, a method includes receiving non-packet-based serialized video information using a physical Universal Serial Bus (USB) interface, deserializing the received non-packet-based serialized video information, and providing a high definition output signal to a video port using the deserialized video information.

In Example 13, any one or more of Examples 1-12 optionally includes converting the deserialized video information to the high definition output signal.

In Example 14, the receiving the non-packet-based serialized video information of any one or more of Examples 1-13 optionally includes receiving non-packet-based serialized high definition video information, and the deserializing the received non-packet-based serialized video information of any one or more of Examples 1-13 optionally includes deserializing the received non-packet-based serialized high definition video information.

In Example 15, the non-packet-based serialized high definition video information of any one or more of Examples 1-14 optionally includes at least one of a 720p, 1080i, or 1080p video stream.

In Example 16, the providing the high definition output signal to the video port of any one or more of Examples 1-15 optionally includes providing a High Definition Multimedia Interface (HDMI) compatible signal to an HDMI video port.

In Example 17, the providing the high definition output signal to the video port of any one or more of Examples 1-16 optionally includes providing a DisplayPort compatible signal to a DisplayPort video port.

In Example 18, the receiving the non-packet-based serialized video information using the physical USB interface of any one or more of Examples 1-17 optionally includes using a physical USB 3.0 interface.

In Example 19, any one or more of Examples 1-18 optionally includes receiving power using the video port.

In Example 20, any one or more of Examples 1-19 optionally includes receiving power using the physical USB interface.

In Example 21, any one or more of Examples 1-20 optionally includes a switch including a first input configured to receive Universal Serial Bus (USB) information, a second input configured to receive serialized video information, and an output configured to provide at least one of the USB information or the serialized video information to a remote device, wherein the switch includes a first state configured to couple the first input with the output and a second state configured to couple the second input with the output.

In Example 22, the first input of any one or more of Examples 1-21 is optionally configured to receive the USB information from a USB controller, and the second input is optionally configured to receive the serialized video information from a video serializer.

In Example 23, any one or more of Examples 1-22 optionally includes the video serializer, wherein the video serializer is configured to receive a video signal from a video controller, to serialize the video signal, and to provide non-packet-based serialized video information to the second input using the video signal.

In Example 24, the first state of the switch of any one or more of Examples 1-23 is optionally configured to provide USB information to the output and to isolate the second input from the output, and the second state of the switch of any one or more of Examples 1-23 is optionally configured to provide serialized video information to the output and to isolate the first input from the output.

In Example 25, the first input of any one or more of Examples 1-24 optionally includes a USB port configured to receive packet-based information according to a USB protocol, and the output of any one or more of Examples 1-24 is optionally is configured to provide the packet-based information to the remote device according to the USB protocol.

In Example 26, the serialized video information of any one or more of Examples 1-25 optionally includes non-packet-based serialized video information, wherein the non-packet-based serialized video information includes a video data stream, and the remote device of any one or more of Examples 1-25 optionally includes a deserializer configured to receive the video data stream using a physical USB interface and to deserialize the received video data stream.

In Example 27, the remote device of any one or more of Examples 1-26 optionally includes a display configured to display the deserialized video data stream.

In Example 28, any one or more of Examples 1-27 optionally includes an integrated circuit, the integrated circuit including the switch.

In Example 29, any one or more of Examples 1-28 optionally includes a video serializer configured to receive a video signal from a video controller and to provide serialized video information to the second input using the video signal, and wherein the integrated circuit of any one or more of Examples 1-28 optionally includes the video serializer.

In Example 30, the serialized video information of any one or more of Examples 1-29 optionally includes non-packet-based high definition video information, wherein the output of any one or more of Examples 1-29 is optionally configured to provide the non-packet-based high definition video information to the remote device using a physical USB interface, and wherein the physical USB interface of any one or more of Examples 1-29 optionally includes a physical USB 3.0 interface.

In Example 31, the non-packet-based high definition video information of any one or more of Examples 1-30 optionally includes at least one of a 720p, 1080i, or 1080p video stream.

In Example 32, any one or more of Examples 1-31 optionally includes a portable device including the switch, a video controller configured provide a video signal, a video serializer configured to receive the video signal from the video controller and to provide non-packet-based serialized video information to the second input of the switch using the video signal, and a USB controller configured to provide the USB information, wherein the switch is configured to provide the USB information to the remote device in the first state using a physical USB interface, and wherein the switch is configured to provide the non-packet-based serialized video information to the remote device in the second state using the physical USB interface.

In Example 33, a method includes receiving Universal Serial Bus (USB) information at a first input of a switch, receiving serialized video information at a second input of the switch, providing the USB information to a remote device using an output of the switch at a time in which the switch is in a first state; and providing the serialized video information to the remote device using the output of the switch at a time in which the switch is in a second state.

In Example 34, the receiving the USB information of any one or more of Examples 1-33 optionally includes receiving USB information from a USB controller, and the receiving the serialized video information of any one or more of Examples 1-33 optionally includes receiving serialized video information from a video serializer.

In Example 35, any one or more of Examples 1-34 optionally includes receiving a video signal from a video controller, and providing non-packet-based serialized video information to the second input of the switch using the video signal.

In Example 36, any one or more of Examples 1-35 optionally includes isolating the second input of the switch from the output of the switch during the first state, and isolating the first input of the switch from the output of the switch during the second state.

In Example 37, the receiving the USB information of any one or more of Examples 1-36 optionally includes receiving packet-based information according to a USB protocol, and the providing the USB information of any one or more of Examples 1-36 optionally includes providing packet-based information to the remote device according to the USB protocol.

In Example 38, the receiving the serialized video information of any one or more of Examples 1-37 optionally includes receiving non-packet-based serialized video information, the non-packet-based serialized video information including a video data stream, and the method of any one or more of Examples 1-37 optionally includes receiving the video data stream using a physical USB interface, and deserializing the received video data stream.

In Example 39, the receiving the serialized video information of any one or more of Examples 1-38 optionally includes receiving non-packet-based high definition video information, and the providing the serialized video information to the remote device of any one or more of Examples 1-38 optionally includes providing the non-packet-based high definition video information to the remote device using a physical USB interface.

In Example 40, the providing the non-packet-based high definition video information of any one or more of Examples 1-39 optionally includes providing at least one of a 720p, 1080i, or 1080p video stream.

In Example 41, a system includes a video serializer configured to receive a high definition video signal from a video controller and to provide non-packet-based serialized high definition video information, a switch including a first input configured to receive Universal Serial Bus (USB) information, a second input configured to receive the non-packet-based serialized high definition video information, and an output configured to provide at least one of the USB information or the non-packet-based serialized high definition video information to a physical USB interface, wherein the switch includes a first state configured to couple the first input with the output and a second state configured to couple the second input with the output.

In Example 42, any one or more of Examples 1-41 optionally includes a deserializer configured to receive the non-packet-based serialized high definition video information using the physical USB interface, to deserailize the received non-packet-based serialized video information, and to provide a high definition output signal to a video port using the deserialized video information.

In Example 43, a system includes a deserializer configured to receive non-packet-based serialized high definition video information using a physical Universal Serial Bus (USB) interface and to deserailize the received non-packet-based serialized high definition video information and a converter configured to convert the deserialized high definition video information to a high definition output signal and to provide the high definition output signal to a video port.

In Example 44, any one or more of Examples 1-43 optionally includes a video serializer configured to receive a high definition video signal from a video controller, to serialize the high definition video signal, and to provide non-packet-based serialized high definition video information, and a switch including a first input configured to receive Universal Serial Bus (USB) information, a second input configured to receive the non-packet-based serialized high definition video information, and an output configured to provide at least one of the USB information or the non-packet-based serialized high definition video information to the physical USB interface, wherein the switch of any one or more of Examples 1-43 optionally includes a first state configured to couple the first input with the output and a second state configured to couple the second input with the output.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system comprising:
   a physical USB interface;
   a video serializer configured to receive a video signal from a video controller, to serialize the video signal, and to provide non-packet-based serialized video information to the physical Universal Serial Bus (USB) interface using the serialized video signal; and
   a deserializer configured to receive the non-packet-based serialized video information from the physical USB interface, to deserialize the received non-packet-based serialized video information, and to provide a high definition output signal to a video port using the deserialized video information.

2. The system of claim 1, including:
   a switch including:
      a first input configured to receive USB information from a USB controller;
      a second input configured to receive the non-packet-based serialized video information from the video serializer; and
      an output configured to provide at least one of the USB information or the non-packet-based serialized video information to the physical USB interface; and
   wherein the switch is configured to couple the first input with the output in a first state and to couple the second input with the output in a second state.

3. The system of claim 2, wherein the first input includes a USB port configured to receive packet-based information according to a USB protocol; and
   wherein the output is configured to provide the packet-based information to the physical USB interface according to a USB protocol.

4. The system of claim 1, wherein the non-packet-based serialized video information includes non-packet-based high definition video information; and
   wherein the physical USB interface includes a physical USB 3.0 interface.

5. The system of claim 4, wherein the non-packet-based high definition video information includes at least one of a 720p, a 1080i, or a 1080p video stream.

6. The system of claim 1, wherein the high definition output signal includes a High Definition Multimedia Interface (HDMI) compatible signal; and
   wherein the video port includes an HDMI video port.

7. The system of claim 1, wherein the high definition output signal includes a DisplayPort compatible signal; and
   wherein the video port includes a DisplayPort video port.

8. The system of claim 1, wherein the deserializer is configured to receive power from the physical USB interface.

9. The system of claim 1, including the physical USB interface and the video port.

10. The system of claim 1, including an integrated circuit, the integrated circuit including the video serializer.

11. A system comprising:
    a physical USB interface;
    a video port;
    a video serializer configured to receive a video signal from a video controller, to serialize the video signal, and to provide non-packet-based serialized video information to the physical Universal Serial Bus (USB) interface using the serialized video signal;
    a deserializer configured to receive the non-packet-based serialized video information from the physical USB interface, to deserialize the received non-packet-based serialized video information, and to provide a high definition output signal to the video port using the deserialized video information.

12. The system of claim 11, including:
    a switch including:
       a first input including a USB port configured to receive packet-based USB information from a USB controller according to a USB protocol; a second input configured to receive the non-packet-based serialized high definition video information from the video serializer; and
       an output configured to provide at least one of the packet-based USB information to the physical USB interface according to a USB protocol or the non-packet-based serialized video information to the physical USB interface;
    wherein the switch is configured to couple the first input with the output in a first state and to couple the second input with the output in a second state; and
    wherein the physical USB interface includes a physical USB 3.0 interface.

13. The system of claim 12, wherein the high definition output signal includes at least one of a High-Definition Multimedia Interface (HDMI) compatible signal or a DisplayPort compatible signal; and
    wherein the video port includes at least one of an HDMI video port or a DisplayPort video port.

14. A method comprising:
    receiving a video signal from a video controller;
    serializing the video signal using a video serializer;
    providing non-packet-based serialized video information to a physical Universal Serial Bus (USB) interface using the serialized video signal;
    receiving the non-packet-based serialized video information from the physical USB interface;
    deserializing the received non-packet-based serialized video information using a deserializer; and
    providing a high definition output signal to a video port using the deserialized video information.

15. The method of claim 14, including:
  receiving USB information from a USB controller at a first input of a switch;
  receiving non-packet-based serialized video information from the video serializer at a second input of the switch;
  providing the USB information from the first input of the switch to the physical USB interface using an output of the switch when the switch is in a first state; and
  providing the non-packet-based serialized video information to the physical USB interface using the output of the switch when the switch is in a second state.

16. The method of claim 15, wherein the providing the USB information to the physical USB interface includes according to a USB protocol; and
  wherein the providing the non-packet-based serialized video information to the physical USB interface includes providing non-packet-based high definition video information using a physical USB 3.0 interface.

17. The method of claim 16, wherein the providing the non-packet-based high definition video information includes providing at least one of a 720p, a 1080i, or a 1080p video stream.

18. The method of claim 14, wherein the providing the high definition output signal to a video port using the deserialized video information includes providing a High Definition Multimedia Interface (HDMI) compatible signal to an HDMI video port.

19. The method of claim 14, wherein the providing the high definition output signal to a video port using the deserialized video information includes providing a DisplayPort compatible signal to a DisplayPort video port.

20. The method of claim 14, including receiving power for the deserializer from the physical USB interface.

* * * * *